United States Patent Office 3,527,645
Patented Sept. 8, 1970

3,527,645
IRRADIATING MUSHROOMS AND
THEIR GROWING SOIL
Samuel L. Casalina, 71 Paddon Road,
Watsonville, Calif. 95076
No Drawing. Filed Sept. 21, 1966, Ser. No. 580,878
Int. Cl. A23l 3/26
U.S. Cl. 99—100          7 Claims

ABSTRACT OF THE DISCLOSURE

Prolonging the market life of raw mushrooms by irradiating them with between 25 and 125 Krad of an ionizing radiation at a dose rate in excess of 25 Krad per minute. Still greater improvement is achieved by maintaining the temperature between 33° and 55° F. during irradiation.

---

The invention relates to the use of ionizing radiation in the treatment of raw mushrooms and their growing soil for prolonging their market life and improving their growth. It is especially, although not exclusively, applicable to the treatment and production of *Agricus campestris* mushrooms, both white and brown varieties, but may be applied to other edible mushrooms and fungi.

In many countries mushrooms such as *Agricus campestris* which are commercially cultivated are preferred in the immature, closed or "button" stage for fresh cooking, canning or other processing. Even if held at a recommended temperature of 33° F. the mushrooms soon open, their stems elongate, and the gills darken. Therefore, mushrooms must be either sold and consumed or canned, freeze-dried or otherwise processed within approximately 2–5 days after harvesting to avoid economic loss.

In growing mushrooms commercially, a nutrient bed is innoculated with mycelium, obtained by germinating mushroom spores, and the bed is covered with a thin layer of casing soil. It was found that soil normally contains nematodes and other organisms which are injurious to mushrooms and it is usual to pasteurize the casing soil. This has heretofore involved the costly and time-consuming operation of heating the soil, as by means of live steam to a temperature of about 140°–180° F. for a prolonged period, such as one-half to one day. Such prior pasteurizing techniques have not, however, destroyed all of the injurious organisms and have produced other changes in the soil which restricted the growth of mushrooms. The nature of these undesirable changes is not known. There is need for an improved process for pasteurizing the casing soil.

It has heretofore been proposed to prolong the market life of harvested mushrooms by irradiation. Thus, Marketing Research Report No. 703, October, 1965, of the U.S. Department of Agriculture, published in Washington, D.C., describes the use of gamma radiations in the treatment of mushrooms. Although some improvement in the market life of mushrooms is reported, the conditions of irradiation employed did not achieve an optimum extension of market life. It was now found that this was due to failure to take cognizance of the temperature at which the mushrooms were irradiated or the dose rate.

In one aspect, the invention provides an improved process for prolonging the market life of mushrooms by controlling the conditions under which the raw mushrooms are irradiated. In another aspect, the invention provides an improved process for growing mushrooms using casing soil which is pasteurized in a manner to destroy more injurious organisms and pathogens and improve the crop of mushrooms while, further, being less time-consuming than the steaming technique.

In summary, market life of raw mushrooms is prolonged beyond that attained by earlier irradiation techniques by subjecting them to between 25 to 125 Krad of an ionizing radiation at a dose rate in excess of 25 Krad per minute. In addition, still greater improvement in market life can be achieved by irradiation at the above dose and dose rate if such irradiation is effected while the mushrooms are at a temperature between about 33° and 50°, preferably between 34° and 44° F., e.g. by pre-cooling.

The growth rate and yield/sq. ft. of mushrooms is, according to the other aspect, improved by cold-pasteurizing the casing soil by subjecting it to ionizing radiation at a temperature below about 110 F., e.g., at ambient temperature, with a dose of between about 55 to about 1,000 Krad. The cold-pasteurizing casing soil is then spread as a thin layer, typically one to two inches in depth, without heating it to above the stated temperature, onto a nutrient bed in which mushroom mycelium has been planted.

It was found that irradiating the mushrooms under the controlled conditions resulted in mushrooms that were less subject to deterioration than mushrooms treated under other conditions, specifically, at higher temperatures and lower dosage rates. Deterioration is judged by the shape, color and stem-length of the mushroom after storage, as will appear in the sequel.

Further, it was found that cold-pasteurization of the casing soil by irradiation, apart from being more convenient and faster than the prior heat-sterilization method, was more effective in destroying nematodes and other pathogens that are injurious to mushrooms and resulted in improved growth and yield of mushrooms.

The unit of radiation "Krad" is used herein to denote the dose which imparts 100,000 ergs of energy to one gram of mushroom or soil. Dose rates are most conveniently measured from direct-reading instruments and are then called "Instrument dose." The absorbed dose, referred herein as "dose," can be determined by known chemical dosimetry tests, as by using methylene blue. Unless otherwise specified herein, the latter test method is intended.

The radiation used for the cold-pasteurization of the casing soil may be the same as that used for irradiating the harvested mushrooms. In either instance, the radiation may consist of or include in significant amounts electromagnetic radiations, also called gamma rays (of which X-rays are an example), preferably having wave lengths between 0.01 and 14 A. (angstrom units). The radiation may, alternatively or additionally, consist of or include in significant amount electrons, sometimes called electron rays, preferably having energies between about $10^{-3}$ and 15 mev. (million electron volts), and beta rays between 0.5 and 15 mev.

The radiation source may be a radionuclide or an electronic device, such as an X-ray tube, a linear accelerator, or a Van de Graaff or a dynamitron-type machine. Radionuclides, such as cobalt 60, iridium 192 and cesium 137, may be formed as the by-product of nuclear reactor operations, or the elemental metal, such as cobalt 59 may be subjected to neutron bombardment to form radioactive cobalt 60. The resulting radiocobalt emits gamma rays with energies of 1.3 and 1.1 mev. and has a half-life of 5.3 years. Beta rays consisting of electrons of nuclear origins may be employed by using as a source a material like strontium 90 and others possessing sufficient energy to cause ionization to an economically significant depth in the mushroom or soil.

Both the casing soil and the mushrooms can be conveniently irradiated by placing them on a moving belt which moves beneath, alongside, or otherwise in proximity to the radiation source. By selecting the intensity of the soure and the speed of the belt, as well as by adjusting the depth of the soil in the case of cold-pasteurization, the dosage can be controlled.

The invention can be better understood by considering the technique used in culturing mushrooms commercially. Mushrooms, being fungi, reproduce by spores which are induced to produce thread-like masses or mycelium, e.g., by collecting spores from a mature, open-gilled mushroom and placing them on a nutritive agar, such as potato-dextrose-yeast agar, for germination. They are then transferred to bottles containing sterile particles of wheat, or rye kernels, horse manure, tobacco stems, kaffir corn, charcoal, or the like, and held at 75° F. until the mycelium threads have covered the particles. The covered particles may be stored with refrigeration until sowing, which involves broadcasting the particles onto a nutrient bed, typically 8 inches thick, and composed of horse manure or other organic material, such as corncobs. Before sowing, the nutrient bed material is composted and heated to kill pests and bacteria which are injurious to mushrooms, e.g. by moistening the bed material in the presence of air to raise the temperature to about 140° F. for one to four weeks, artificial heat being applied if the bacterial action is insufficient. Excessive temperatures are detrimental during this heating period and result in a reduced mushroom crop. The bed is cooled to below 75° F. before sowing.

The spawning period follows sowing and lasts for two to three weeks. During this period the bed is maintained moist but not soggy, as by a fine water spray, and maintained at a temperature of about 50° to 75° F.; the mycelium grows into the bed with whitish threads but does not develop into the fruiting stage until a thin layer—typically one to two inches in depth—of casing soil is placed over the bed. After the casing soil has been applied the bed is held between about 50 and 75° F., and several successive flushes or "breaks" of mushrooms appear, in rythmic fashion. The greatest production is obtained from the first two breaks, but bed properly adjusted for moisture and temperature will continue to produce mushrooms for several months, producing about 1.5–3 lbs. per sq. foot.

Although the chemical content of the casing soil is not nutritionally significant to the mushroom, it is important that its pH be between 5.5 and 8.0.

One of the serious causes of crop failure has been hordes of certain species of nematodes which occur in most soils. They have heretofore been controlled by heating the soil, as by live steam, for extended periods, as was noted above. Now according to one feature of the invention the casing soil is pasteurized by radiation, without the use of heat. The dosage may be varied in accordance with the organisms initially present and is usually 80 Krad upward to about the megarad range. The advantages of this technique are apparent from the following example.

EXAMPLE 1

Four test samples of casing soil composed of 70 percent rich topsoil and 30 percent peat moss were heat-pasteurized by heating with live steam and maintaining them at 140° F. for 20 hours. Four additional samples of like soils were radio-pasteurized according to the invention by subjecting them at a temperature of 70° F. to 290 Krad of irradiation, using cobalt 60 as a source. Nematode and mold-colony counts were made on each pasteurized sample, the former by a microscope (50× lens) having a grid field, after filtration by the Bear Funneltest; the latter by culturing in casing soil sample in potato-dextrose-yeast agar, and microscopic examination. The results are shown in Table 1:

TABLE 1

| Sample | Live Nematodes | | | | Mold Colonies | | | |
| --- | --- | --- | --- | --- | --- | --- | --- | --- |
|  | 1 | 2 | 3 | 4 | 1 | 2 | 3 | 4 |
| Heat-pasteurized | 1 | 0 | 2 | 1 | 2 | 0 | 2 | 1 |
| Radio-pasteurized | 0 | 1 | 0 | 1 | 1 | 0 | 0 | 1 |

The superior results obtained by pasteurizing the casing soil by radiation is evident from the reduced numbers of live nematodes and mold colonies.

Tests were further conducted by using the casing soil pasteurized by the two methods to cover, to identical depths, different nutrient beds that had been treated and sowed in the same manner. The flushes of mushrooms produced in the bed covered with the radio-pasteurized casing soil were greater and contained larger mushrooms than those produced in the other bed.

EXAMPLE 2

The following table illustrates the growing yield advantages of radiopasteurized soils when compared with heat pasteurized growing media. In this example, 40 pounds of identically constituted casing soil (70 percent rich Pajaro Sandy Loam and 30 percent peat moss) were divided into two 20 pound batches. One 20 pound batch was irradiated with cobalt 60 to an absorbed dose of 500 Krad delivered at a dose rate of 50 Krad per minute. The irradiated soil was divided into four samples of 5 pounds each and spread over sown mushroom spawn planted in four two foot square planting grids.

The unirradiated (control) soil was similarly divided into four 5 pound samples and placed over spawn sown growing areas each of which was two feet square.

Table 2 compares the harvest yield approximately five weeks after casing from each of the sample plots. The yield is in grams per each four square foot plot.

TABLE 2

Control Samples:               Irradiated Samples
1 ------------------------------------------ 4,520
2 ------------------------------------------ 3,908
3 ------------------------------------------ 5,300
4 ------------------------------------------ 4,100
1 ------------------------------------------ 4,560
2 ------------------------------------------ 5,160
3 ------------------------------------------ 5,620
4 ------------------------------------------ 5,500

The above table shows an increased yield of over 16 percent for the irradiated growing media. The factors (increased availability of nutrients due to ionization, "cleaner" growing environment, etc.) yielding these results are not completely understood.

The following examples, numbers 3 and 4, show separately the effects of irradiating the raw mushrooms at a high dosage rate and at a low temperature. In both examples, the following test scale was used to characterize the degree of deterioration of the mushrooms:

TABLE 3.—TEST SCALE

Merit No.:         Characteristics of Mushrooms
10 ------ Entirely closed, compact, immature appearance.
9 ------ Some swelling, either lateral or overall.

TABLE 3.—Continued

| Merit No.: | Characteristics of Mushrooms |
|---|---|
| 8 | Partial or radial opening, less than 50% of circumference, open at one side of stem and closed on the other side. |
| 7 | Slight separation of cap from stem on entire circumference. |
| 6 | Very slightly open, less than 5% of cap radius. |
| 5 | Slightly open, less than 10% of cap radius. |
| 4 | Slightly open, less than 20% of cap radius. |
| 3 | Moderately open, less than 40% of cap radius. |
| 2 | Cap open 40–60% of cap radius. |
| 1 | Cap well open, edge of cap still upturned but open less than 80% of cap radius. |
| 0 | Cap fully open, edges flat. |

Also in Example 3 and 4, four different test samples were subjected to different storage conditions, representative of commercial conditions. These test sample numbers and the storage conditions are given in Table 4.

TABLE 4.—STORAGE CONDITIONS

| Test Sample Number | Storage condition | Remarks |
|---|---|---|
| 1 | 1–30 days at 34° F | Prolonged storage simulation. |
| 2 | 4–5 days at 34° F.; then 18 days, each at 55° F. for 12 hrs. and 34° F. for 12 hrs. | Good retail handling simulation. |
| 3 | 4–5 days at 34° F.; then 10 days at 65° F. | Poor retail handling simulation. |
| 4 | 2 days at 34° F.; then shipped for 400 miles by truck at 40° F. and returned to refrigeration; total 10 days. | Shipment simulation. |

EXAMPLE 3

To demonstrate the improved effect of irradiating mushrooms at high dose rates, freshly picked white and brown mushrooms, *Agricus compestris* were precooled to temperatures between 33° and 44° F. Eight different batches were irradiated, using a cobalt 60 source, with batches 1 through 4 being irradiated at a low rate of about 8 Krad per minute, and batches 5 through 8 being irradiated at higher rates, between about 32 to 45 Krad per minute, all as indicated in Table 5. Four different test samples from each of the eight irradiated batches were subjected to the storage conditions described in Table 4. The conditions of the mushrooms in all 32 test samples are indicated in the last four columns of Table 5, using the merit number defined in Table 3.

The foregoing data demonstrates a dose-rate dependency effect, in that batches that were irradiated at rates in excess of 32 Krad per minute resulted in mushrooms that, after storage, had greatly improved merit numbers. Thus, the average increase was about 2 merit numbers.

EXAMPLE 4

To demonstrate the effect of the mushroom temperature during irradiation, two batches of freshly picked mushrooms as described in Example 3 were irradiated with the same type of radiation to a total dosage of 50 Krad, at a rate of 40 Krad per minute. However, in the first batch the mushrooms were irradiated immediately after picking, at ambient temperature of about 70° F., while in the second batch the mushrooms were precooled to a temperature of 34° F. and irradiated at this temperature. Four test samples from each batch were stored at different conditions as for the previous example, test samples 1 through 4 being taken from the first batch and 5 through 8 from the second batch. The conditions of the mushrooms are given in the last four columns of Table 6.

TABLE 6

| | Irradiation temperature, °F. | Mushroom Merit Number-Test Sample Number | | | |
|---|---|---|---|---|---|
| | | 1 | 2 | 3 | 4 |
| Batch No.: | | | | | |
| 1 | 70 | 6–8 | 6–7 | 4–6 | 6–7 |
| 3 | 34 | 7–10 | 7–9 | 7 | 7–9 |

The merit numbers of the mushrooms that were precooled and irradiated at the lower temperature were over 1.7 higher than those of the first batch.

In addition to producing mushrooms that have higher merit numbers on the test scale of Table 3, the irradiation treatments according to the invention were found to cause improved preservation of gill coloring. This color is light pink for the best-quality mushrooms and progresses through pinkish tan and brown to black as the mushroom deteriorates. Similarly, the irradiation of this invention retards stem elongation or growth, which may vary from nil to 40 percent. However, no numerical comparative data on these features are presented.

I claim:

1. A process for extending the market life of mushrooms which comprises subjecting raw mushrooms to an irradiation dose of between about 25 to about 125 Krad of an ionizing radiation at a dose rate in excess of about 25 Krad per minute.

2. A process as defined in claim 1 wherein said mushrooms are *Agricus campestris*.

TABLE 5

| | Duration of irradiation, minutes | Instrument dose, Krad | Actual chemical dosimetry dose, Krad | Mushroom Merit No.-Test Sample Number | | | |
|---|---|---|---|---|---|---|---|
| | | | | 1 | 2 | 3 | 4 |
| Batch No.: | | | | | | | |
| 1 | 5 | 40 | 36.7 | 6–7 | 4–5 | 4 | 6–7 |
| 2 | 6.25 | 50 | 46.0 | 7 | 5 | 4–5 | 7–8 |
| 3 | 7.50 | 60 | 55.1 | 7–8 | 4–6 | 5 | 7–8 |
| 4 | 8.25 | 70 | 64.4 | 7–8 | 5–6 | 6–7 | 7–9 |
| 5 | 0.87 | 40 | 38.6 | 7–9 | 7–8 | 7 | 7–9 |
| 6 | 1.25 | 50 | 47.1 | 7–10 | 8 | 7–8 | 7–9 |
| 7 | 1.67 | 60 | 58.2 | 7–10 | 8–9 | 6–8 | 7–10 |
| 8 | 2.13 | 70 | 68.9 | 8–10 | 8–10 | 6–8 | 8–10 |

3. A process as defined in claim 1 wherein the radiation includes in significant amount electromagnetic radiations having a wave length between about 0.01 and about 14 A.

4. Process as defined in claim 1 wherein the radiation includes in significant amount electron beams having energies between about $10^{-3}$ and about 15 mev.

5. A process as defined in claim 1 wherein the radiation includes in significant amounts beta rays of about 0.5 to about 15 mev.

6. A process as defined in claim 1 wherein said mushrooms are maintained at a temperature between about 33° and about 50° F.

7. A process as defined in claim 6 wherein said temperature is between 34° and 44° F.

References Cited

UNITED STATES PATENTS 2,894,846   7/1959   Stoddard _____ 99—217

OTHER REFERENCES

Staden, O. L., Irradiated Mushrooms Taste Better Euratom Bulletin III, 1964, pp. 18–19.

A. LOUIS MONACELL, Primary Examiner

J. M. HUNTER, Assistant Examiner

U.S. Cl. X.R.

99—140, 154, 217

UNITED STATES PATENT OFFICE
CERTIFICATE OF CORRECTION

Patent No. 3,527,645      Dated September 8, 1970

Inventor(s) Samuel L. Casalina

It is certified that error appears in the above-identified patent and that said Letters Patent are hereby corrected as shown below:

Column 2, line 20, change "F" to ---°F---.

Column 3, line 12, change "soure" to ---source---.

Column 4, TABLE 2 is corrected to read:

Control Samples

1----------------------------4,520

2----------------------------3,908

3----------------------------5,300

4----------------------------4,100

Irradiated Samples

1----------------------------4,560

2----------------------------5,160

3----------------------------5,620

4----------------------------5,500

Column 6, TABLE 6 under Batch No. change "3" to ---2---.

2-------------------------34   7-10   7-9   7   7-9

SIGNED AND SEALED
JAN 26 1971

(SEAL)
Attest:

Edward M. Fletcher, Jr.
Attesting Officer

WILLIAM E. SCHUYLER, JR.
Commissioner of Patents